United States Patent
Eaton et al.

(10) Patent No.: US 7,705,588 B2
(45) Date of Patent: Apr. 27, 2010

(54) APPARATUS AND METHOD FOR TESTING MAGNETIC DISK DRIVE COMPONENTS USING DRIVE-BASED PARTS

(75) Inventors: Robert Eaton, San Jose, CA (US); Gang Herbert Lin, San Jose, CA (US); Tao Lin, Santa Clara, CA (US); Amir Ali Companieh, San Francisco, CA (US); Rob Milby, Santa Cruz, CA (US); Ron Carroll, San Jose, CA (US); Robert Kimball, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 1129 days.

(21) Appl. No.: 11/245,250

(22) Filed: Oct. 5, 2005

(65) Prior Publication Data
US 2006/0072230 A1   Apr. 6, 2006

Related U.S. Application Data

(60) Provisional application No. 60/616,243, filed on Oct. 6, 2004, provisional application No. 60/616,244, filed on Oct. 6, 2004.

(51) Int. Cl.
*G01R 33/12* (2006.01)
(52) U.S. Cl. .................... 324/210; 324/262
(58) Field of Classification Search ......... 324/210–213, 324/262; 360/76, 78.04–78.14, 240, 250, 360/264, 264.1, 264.7–264.9, 270–271, 290, 360/294.1–294.7; 108/143; 248/646, 651–652
See application file for complete search history.

(56) References Cited

U.S. PATENT DOCUMENTS

| | | | |
|---|---|---|---|
| 6,229,664 B1 * | 5/2001 | Albrecht et al. | 360/75 |
| 6,242,910 B1 * | 6/2001 | Guzik et al. | 324/212 |
| 6,696,831 B2 * | 2/2004 | Nozu | 324/210 |
| 6,930,850 B2 * | 8/2005 | Takagi et al. | 360/77.03 |
| 2004/0001415 A1 * | 1/2004 | Formato et al. | 369/69 |
| 2005/0264922 A1 * | 12/2005 | Erden et al. | 360/78.04 |

* cited by examiner

*Primary Examiner*—Bot L LeDynh
(74) *Attorney, Agent, or Firm*—McCarthy Law Group

(57) ABSTRACT

An apparatus and method for testing a component of a magnetic disk drive in which one or more drive-based components is used in the testing process. Each of the drive-based components is based on a corresponding one of the components of the magnetic disk drive. During testing, the component to be tested and at least one of the drive-based components are selectively engaged.

22 Claims, 7 Drawing Sheets

APPARATUS AND METHOD FOR TESTING MAGNETIC DISK DRIVE COMPONENTS USING DRIVE-BASED PARTS

CROSS-REFERENCE TO RELATED APPLICATIONS

The present application claims priority from U.S. Provisional Patent Application Ser. No. 60/616,243 filed on Oct. 6, 2004 entitled "APPARATUS FOR TESTING HARD DISK DRIVE COMPONENTS FOR TIMING, READING, WRITING, MOTOR CONTROL AND SERVO POSITIONING USING PRODUCTION PARTS" and from U.S. Provisional Patent Application Ser. No. 60/616,244 filed on Oct. 6, 2004 entitled "LIGHTWEIGHT HDD ACTUATOR ARM TO HGA ATTACHMENT DEVICE FOR HDD COMPONENT TESTER," the entirety of which are incorporated herein by reference.

BACKGROUND OF THE INVENTION

The present invention relates generally to data storage devices and more specifically, to apparatus and methods for testing components of magnetic disk drives.

Magnetic disk drives are typically composed of components such as read/write heads, actuators, magnetic disks, spindle motors, printed circuit board assemblies and firmware. These components are tested during manufacturing using one or more component testing machines to ensure that they meet the specified performance requirements. Depending on the component being tested, the tests typically measure the component's performance with respect to timing, reading, writing, motor control and servo positioning.

However, the use of conventional component testing machines to test drive components is very costly due to their complicated electrical and mechanical designs. Conventional testers typically have used expensive precision, custom-made components such as mechanical positioning stages, stepper motors, discrete channels, air-bearing spindle motors and motor plate mechanics.

In addition, conventional testers have been typically designed with little consideration of the disk drive environment. The testers' electronics typically were customized to meet the component frequency testing requirements. The testers' mechanics typically were customized to provide the best run-out control without considering high-speed run-out canceling. Further, the testers' software was typically designed to work independently of drive control. Thus, conventional testers did not test components in an environment similar to that of an actual disk drive.

As a result, the correlation between the analog test measurements of components obtained with conventional testers and their actual performance in disk drives has been relatively low. This low correlation resulted in relatively high levels of over-rejects and false acceptance of components.

Another disadvantage of conventional testers is that they relied on mechanical positioners to place the head on the written track instead of using a servo control loop. This limited the track control or tracks per inch (TPI) capabilities of these testers. Further, the positioners were not be able to support track-following of high-frequency track misregistration (TMR) because of the low bandwidth inherent to their large mass and size.

Accordingly, there is a need for a tester for magnetic disk drive components that is lower in cost, provides more accurate test results and is capable of testing higher TPI disk drives than conventional testers.

BRIEF SUMMARY OF THE INVENTION

The present invention is directed to an apparatus and method for testing a component of a magnetic disk drive in which one or more drive-based components is used in the testing process. Each of the drive-based components is based on a corresponding one of the components of the magnetic disk drive. The present invention may be used to test the performance of the component with respect to timing, reading, writing, motor control and servo positioning, among others.

In an embodiment of the present invention, the apparatus comprises: (1) one or more drive-based components, each of which is based on a corresponding one of the plurality of components of the magnetic disk drive and (2) a control apparatus configured to selectively engage the component to be tested and at least one of the one or more drive-based components.

The corresponding method comprises the steps of: (1) providing one or more drive-based components, each of which is based on a corresponding one of the plurality of components of the magnetic disk drive; (2) selectively engaging the component to be tested with at least one of the one or more drive-based components and (3) performing a test on the component to be tested.

In another embodiment of the present invention, the one or more drive-based components may include an actuator arm. In this embodiment, the apparatus may further include a connector for detachably coupling the component to be tested to the actuator arm.

In yet another embodiment of the present invention, the one or more drive-based components may include a first driver. In this embodiment, the apparatus may further include a second driver coupled to an output of the first driver in which the second driver has a greater driving capability than the first driver.

A tester constructed in accordance with the present invention provides a number of advantages over conventional component testers because it uses components that are based on the components of an actual magnetic disk drive. First, the tester takes less time and cost to develop because it leverages all of the normal magnetic disk drive development and production activities and tools.

Second, the tester is less expensive to build because it uses components from or based on those used in production disk drives rather than custom made components.

Third, the tester can be adapted to test various different components of the magnetic disk drive. In contrast, conventional testers are typically capable of testing head-arm assemblies (HAAs) or head-gimbal assemblies (HGAs) only.

Fourth, the tester is capable of testing magnetic disk drives with considerably higher accuracy than conventional testers. The tester is more accurate because it provides a testing environment for components that is much closer to that of an actual disk drive. The use of drive-based components allows the tester to perform high-precision, high-bandwidth track positioning during testing with no long-term position drift.

Fifth, the tester is capable of testing magnetic disk drives with higher TPI densities than conventional testers. This is partly because the tester uses a voice coil motor (VCM)-based actuator that is similar to the actuator of a disk drive. Like the disk drive actuator, the actuator used in the tester is very light, highly optimized and uses a high-bandwidth track-following servo. This allows the tester to track higher TPI and follow higher frequency TMR than conventional testers.

Additional advantages of the present invention will become readily apparent from the following discussion, particularly when taken together with the accompanying drawings.

DETAILED DESCRIPTION OF THE INVENTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
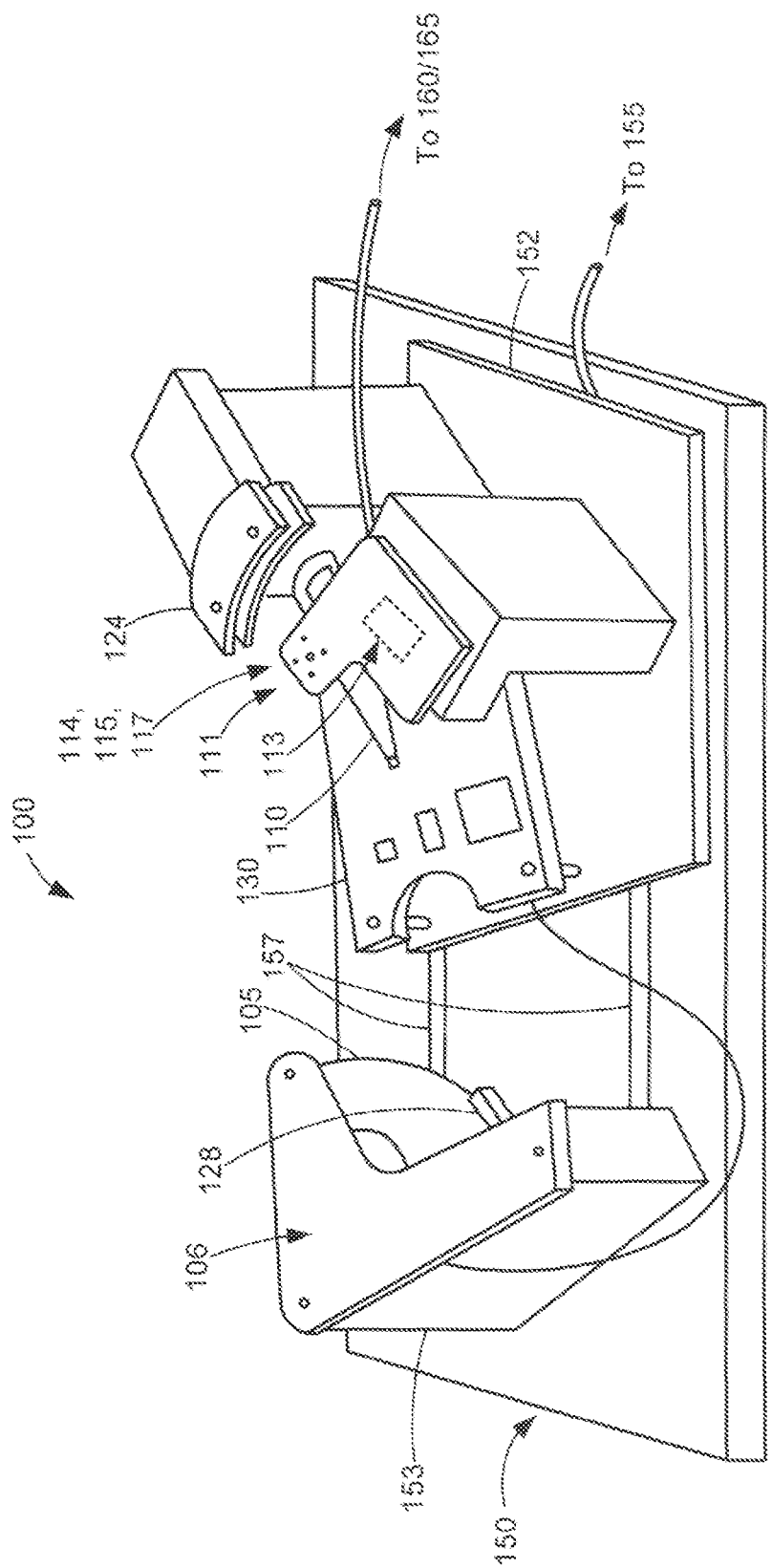
FIG. 1 is a simplified perspective drawing of a magnetic disk drive component tester 100 in accordance with one embodiment of the present invention.
Figure 2:
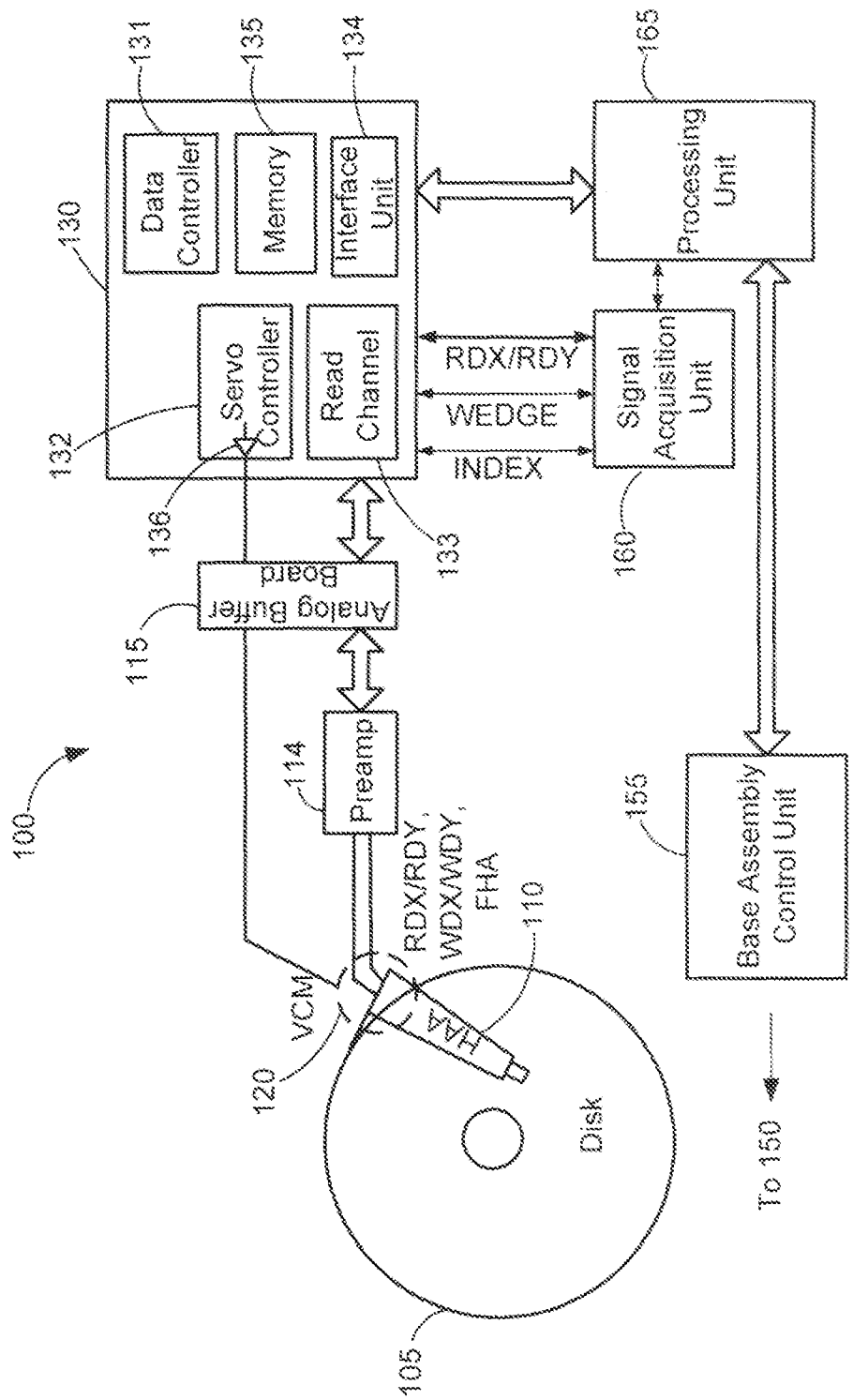
FIG. 2 is a simplified block diagram of the tester 100 shown in FIG. 1.

FIGS. 1 and 2 show a magnetic disk drive component tester 100 in accordance with one embodiment of the present invention. FIGS. 1 and 2 respectively depict in simplified form a perspective drawing and a block diagram of the tester 100. The tester 100 is used to perform parametric tests on a disk drive component known as a head-arm assembly (HAA) 110.

The tester 100 can also be used to test head-stack assemblies (HSAs) or head-gimbal assemblies (HGAs) with slight modifications. In other embodiments of the present invention, the tester may be used to test other components of magnetic disk drives such as disks, motors or printed circuit board assemblies.

Figure 3:
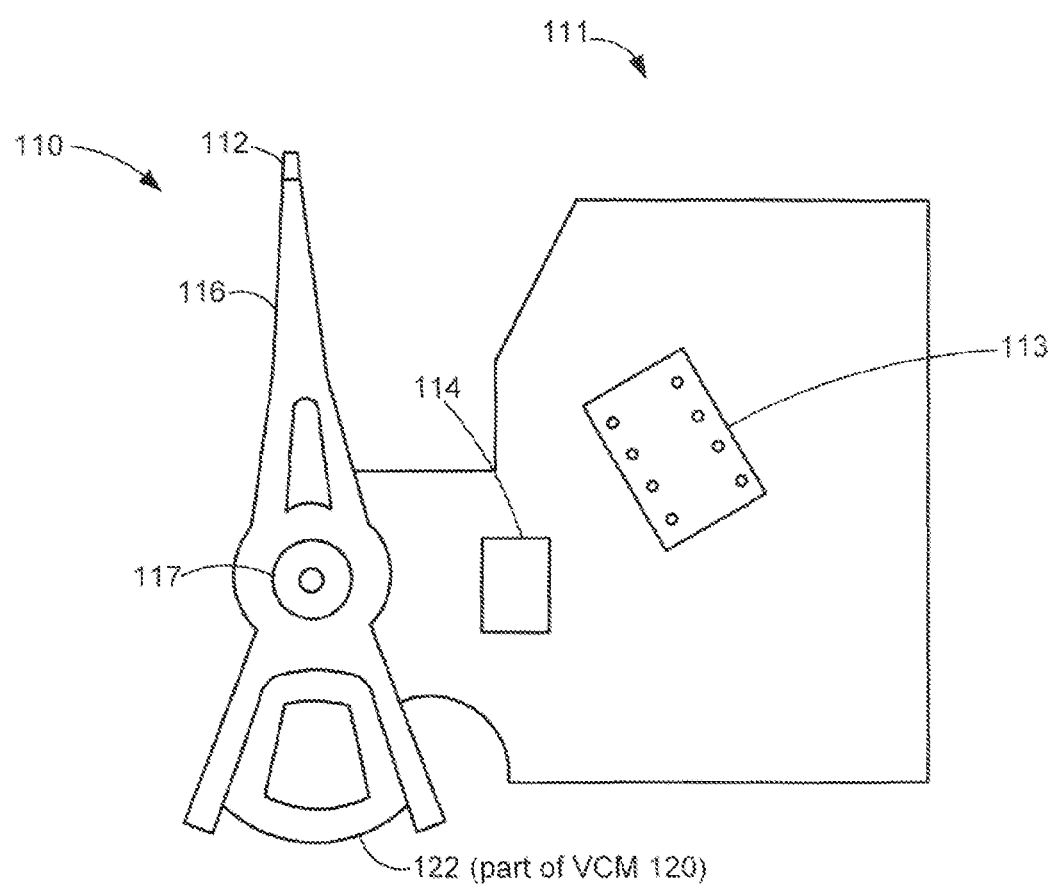
FIG. 3 is a simplified diagram of the HAA 110 and the cartridge 111 shown in FIGS. 1 and 2.

FIG. 3 shows a simplified diagram of the HAA 110 and a cartridge 111. The HAA 110 comprises a read/write head 112, an actuator arm 116 and a voice coil 122. The voice coil 122 together with a VCM magnet assembly (described later) forms a VCM 120. The HAA 110 is attached to the cartridge 111 for mounting on the tester 100, as described in more detail below.

The tester 100 is constructed from a number of components based on, or adapted from, the corresponding components in a magnetic disk drive. The drive-based components of the tester 100 may be either identical to the corresponding components of the disk drive or suitably modified for use in the tester. Referring to FIGS. 1 and 2, the drive-based components include a pre-servowritten magnetic disk 105, a spindle motor assembly 106, a VCM magnet assembly 124, a preamplifier 114, an actuator pivot bearing 117, a load/unload ramp 128, a printed circuit board assembly (PCBA) 130 and firmware (not shown). The tester 100 generally uses the drive-based components in a manner substantially similar to those of a disk drive.

The pre-servowritten magnetic disk 105 is a magnetic disk that is either fully or partially written with a servo pattern prior to installation in the tester 100. A disk 105 that is fully pre-servowritten has a servo pattern similar to that of a disk in a completed disk drive. A disk 105 that is partially pre-servowritten has a servo pattern similar to that of a disk just prior to being installed in a disk drive during manufacture. The pre-servowritten disk 105 is obtained by either writing a servo pattern on an unpatterned disk using a servo writer machine (as is known in the art) or extracting a pre-servowritten disk from a disk drive. For a partially servowritten disk 105, the tester 100 writes the remaining portion of the servo pattern on the disk using the pre-written servo pattern as a reference.

The spindle motor assembly 106 consists of a spindle motor (not shown) for rotating the disk 105 and spindle motor bearings. The spindle motor bearings may be of either the ball bearing or the fluid bearing type, depending on the type of spindle motor used.

The VCM magnet assembly 124 consists of a retractable set of magnets. The VCM magnet assembly 124 together with the voice coil 122 form the VCM 120. During testing, the VCM magnet assembly 124 is merged with the voice coil 122 as described further below.

The preamplifier 114 is used for amplifying the signals received from the read/write head 112 on the HAA 110 before being received by the PCBA 130.

The actuator pivot bearing 117, which is attached to the cartridge 111, is used to pivotably mount the actuator arm 116

The load/unload ramp 128 is used to safely merge the HAA 110 onto the disk 105 as well as to secure the HAA when not in use.

The PCBA 130 contains the electronic circuitry used to control the operation of a disk drive. The PCBA 130 includes a data controller 131, a servo controller 132, a read channel 133, an interface unit 134 and a memory 135, among other components. The servo controller 132 includes a VCM driver (amplifier) 136 for driving the voice coil 122 of the VCM 120. The read channel 133 is coupled to the preamplifier 114 to receive the signals output by the HAA 110. The interface unit 134 provides the disk drive with a means for communicating with a processing unit 165 (described later). The interface unit 134 may provide an industry-standard disk drive interface such as PATA/SATA or SCSI. The PCBA 130 may also include a test port (not shown) for the input and output of test signals.

An analog buffer board 115 (not a drive-based component) is located between the PCBA 130 and the preamplifier 114 on the tester 100. The analog buffer board 115 allows the HAA 110 to be electrically coupled and decoupled from the PCBA 130 as needed during tester operation. Typically, this involves switching off the power to the preamplifier 114 when the cartridge 111 is attached or detached from the tester 100.

The firmware consists of the low-level, hardware-based control routines that are used to control the operation of a disk drive. The firmware is stored in the processing unit 165 (described later) and downloaded to the memory 135 during the testing process. The firmware has been modified from the firmware used in a disk drive to include diagnostic commands. The diagnostic commands provide the functionality of a conventional component tester such as seeks, preamp control and writes.

In addition, servo code in the firmware has been modified to enable the servo to remove the large servo error caused by the eccentricity of the servo tracks on the disk 105. The eccentricity arises because the disk 105 is servowritten using a servo writer machine before being placed in the tester 100. The servo error is removed using a feedforward technique known as adaptive runout correction (ARC).

Referring again to FIG. 3, the cartridge 111 contains the actuator pivot bearing 117 on which the actuator arm 116 of the HAA 110 is pivotably mounted. The cartridge 111 includes a detachable "pogo" connector 113 for mounting the cartridge on the base assembly 150, thereby creating an electrical connection between the HAA 110 and the PCBA 130.

Referring back to FIGS. 1 and 2, the tester 100 includes a base assembly 150 for mounting the cartridge 111 and the drive-based components. The depicted base assembly 150 includes a movable platform 152 and a stationary platform 153. The movable platform 152 is used to mount the cartridge 111, the VCM magnet assembly 124, the preamplifier 114, the buffer board 115, the actuator pivot bearing 117 and the PCBA 130. The stationary platform 153 is used to mount the disk 105, the spindle motor assembly 106 and load/unload ramp 128. The movable platform 152 is provided to allow easy insertion and removal of the HAA 110 from the tester 100, thus making the tester suitable for production testing. In alternative equivalent embodiments of the present invention the movable platform can be used to mount the disk 105, spindle motor assembly 106, and load/unload ramp 128, and the stationary platform can be used to mount the cartridge 111, VCM magnet assembly 124, preamplifier 114, buffer board 115, actuator pivot bearing 117, and PCBA 130.

During the testing process, the movable platform 152 is moved along a track 157 on the base assembly 150 toward the stationary platform 153 so as to selectively engage the HAA 110 with the disk 105. Upon engagement, the HAA 110 and the drive-based components are positioned and can operate in a manner similar to that of the corresponding components in a disk drive.

The tester 100 also includes a base assembly control unit 155. The base assembly control unit 155, in conjunction with the processing unit 165 (described later), controls the operation of the base assembly 150 so as to selectively engage and disengage the HAA 110 from the disk 105 as previously described. The base assembly control unit 155 also controls the operation of the analog buffer board 115.

The tester 100 further includes a signal acquisition unit 160, the processing unit 165 and test software (not shown). In the present embodiment of the invention, the signal acquisition unit 160, the processing unit 165 and the test software are integrated in a single component, specifically, a customized digital oscilloscope.

The signal acquisition unit 160 is used to read analog electrical signals output by the HAA 110 during the testing process. The signals are read from the read channel 133 of the PCBA 130 using the analog measurement capabilities of the channel.

The processing unit 165 in conjunction with the test software controls the overall operation of the tester 100 during the testing process. The processing unit 165 includes an interface (not shown) for communicating with the PCBA 130, such as PATA/SATA or SCSI. The processing unit 165 includes another interface (not shown) for communicating with the base assembly control unit 155, such as the industry-standard RS-232 or USB interfaces.

The test software, which is stored on and executed by the processing unit 165, is used to define and control the parametric tests performed by the tester 100. The test software coordinates the sampling, processing and storage of data obtained from the HAA 110 with the signal acquisition unit 160 during testing. The test software also provides dispositioning information for the HAA 110 to the test operator. In addition, the test software may support the download of self-test code into the PCBA 130 such that the tester 100 can perform autonomous testing and calibrations.

The parametric tests are used to evaluate the performance of the HAA 110 with respect to various characteristics, such as track average amplitude, fly height adjust, RW offset and BPI/TPI capabilities. The BPI capability tests include spectral SNR, overwrite, pulse width and non-linear transition shift measurements. The TPI capability tests include writer/reader width, off-track read, erase band and squash measurements.

Figure 4:
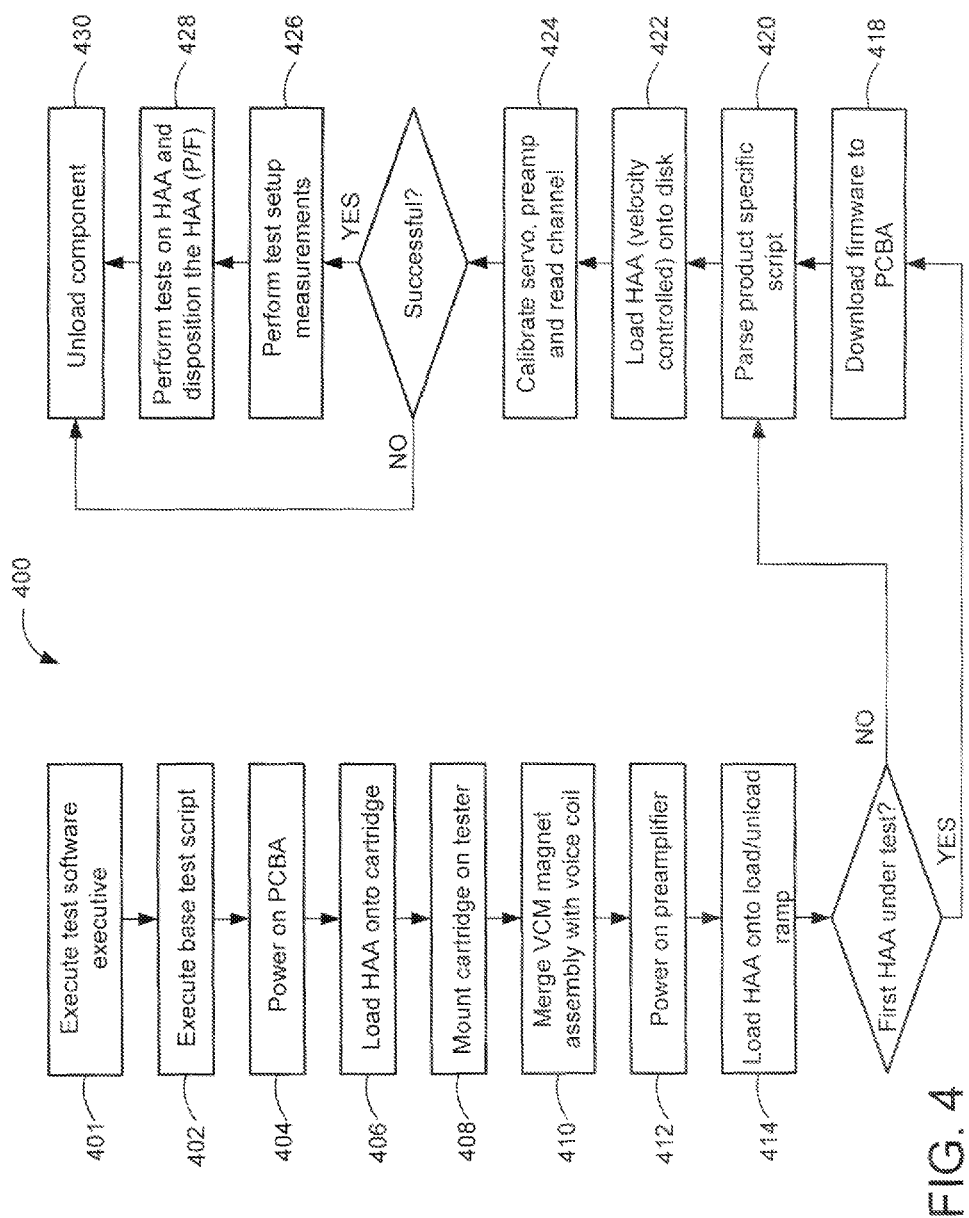
FIG. 4 is a flow chart showing a method of testing a magnetic disk drive component using the tester 100.

FIG. 4 is a flow chart showing a method 400 of operating the tester 100 described above to test the HAA 110. In this method, some of the drive-based components including the disk 105, the spindle motor assembly 106, the VCM magnet assembly 124 and the PCBA 130 are assumed to have been already mounted on the base assembly 150.

In step 401, execute an executive code portion of the test software to initiate testing.

In step 402, execute a base test script from an archive in the test software.

In step 404, turn on the power to the PCBA 130.

In step 406, load the HAA 110 to be tested onto the cartridge 111.

In step 408, mount the cartridge 111 on the base assembly 150.

In step 410, merge the voice coil 122 and the VCM magnet assembly 124 to form the VCM 120.

In step 412, turn on the power to the preamp 114.

In step 414, move the movable platform 152 of the base assembly 150 to a position such that the HAA 110 is loaded onto the load/unload ramp 128. At this point, the HAA 110 is engaged with the drive-based components in a manner similar to that in a disk drive.

In step 418, if this is the first HAA 110 being tested, download the firmware (including boot and buffer code) to the PCBA 130. If this is not the first test, skip step 418.

In step 420, execute scripts in the test software specific to the particular type of HAA 110 being tested.

In step 422, perform a velocity-controlled load of the HAA 110 onto the disk 105, which is now spinning.

In the case where the disk 105 is only partially servowritten, the remaining portion of the servo pattern on the disk 105 is now written using the existing servo pattern as a reference (step not shown).

In step 424, calibrate the servo controller 132, the read channel 133 and preamplifier 114 in a manner similar to that performed by a disk drive with a pre-servowritten disk during startup.

In step 426, if the calibration was successful, perform test setup measurements by executing a test setup script in the test software. The measurements include micro jog, fly-height adjust and scope amplitude calibration. If the calibration was not successful, skip steps 426 and 428.

In step 428, conduct the parametric tests on the HAA 110 by running a test script in the test software. Disposition (pass/fail) the HAA based on the test results.

In step 430, unload the HAA 110 from the tester 100. This step essentially consists of executing steps 406 and 408 in reverse.

Repeat steps 406 through 430 for each HAA 110 to be tested.

In addition to component testing, the tester 100 can be used for data recovery applications. In these applications, a disk would be extracted from the failed disk drive and placed on the tester. A known good HAA 110 would then be used to read the data off of the disk. The tester provides significantly improved servo positioning on the disk over conventional testers because it makes full use of the servo patterns on the disk itself.

In other embodiments of the present invention, additional modifications can be made to the tester 100. For example, modifications can be made to the drive-based components to improve the performance of the tester 100. These modifications are permissible due to the relaxed use requirements for the components in a test environment. For instance, since on track performance is much more important than seek performance in a test environment, the servo mechanism (in the firmware and/or hardware) can be optimized for track following performance at the expense of seek performance. Further improvement to track following can be made to the servo mechanism by removing the requirements for tolerating extreme mechanical shock.

As another example, disk dampers and shrouding can be placed in the tester to improve performance. These components are normally left out of production disk drives due to shock and acoustic considerations.

In addition, the firmware can be further modified to provide the tester 100 with drive-level testing capabilities such as optimization, bit-error rate (BER) testing and servo diagnostics.

Another possible modification is to provide a movable portion of the base assembly that pivots rather than moves linearly to selectively engage the HAA 110 with the disk 105. As an alternative, the stationary platform of the base assembly can be replaced with a second movable platform in which the two platforms move toward each other.

In yet another embodiment, the signal acquisition unit 160 and/or the processing unit 165 may be integrated into the PCBA 130. By integrating these components, the signal acquisition unit 160 and the processing unit 165 can share circuitry with the PCBA 130, thereby improving the reliability and reducing the cost of the tester. Alternatively, the signal acquisition unit 160 and/or the processing unit 165 may be implemented as components external to the tester 100 (e.g., a digital oscilloscope and a personal computer).

Figure 5:
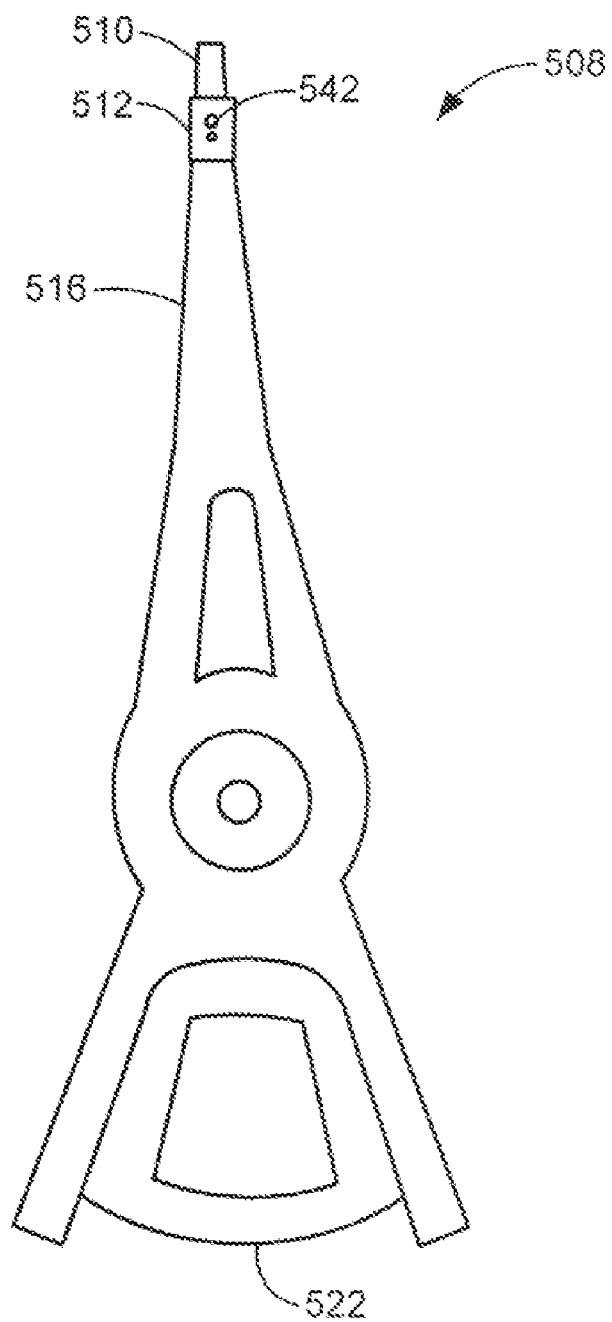
FIG. 5 is a simplified diagram of an actuator assembly 508 of a component tester 500 in accordance with an alternate embodiment of the present invention.

FIG. 5 is a diagram showing an actuator assembly 508 of a component tester 500 (not shown) in accordance with another embodiment of the present invention. In this embodiment, the tester is used to test an HGA 510 rather than the HAA 110. The tester in this embodiment is identical in most respects to the tester 100 described above; only the differences will be discussed.

In this embodiment, a connector 512 is used to temporarily attach the HGA 510 to an actuator arm 516 of the tester. The connector 512 provides both mechanical and electrical connections between the HGA 510 and the actuator arm 516. In an actual disk drive, the HGA is typically attached to the actuator arm using swaging and electrical bonding. The connector 512 is lightweight as compared to the mass of the actuator arm 516 so that the mechanical behavior of the HGA 510 deviates minimally from that of an HGA operating in a disk drive.

Figure 6:
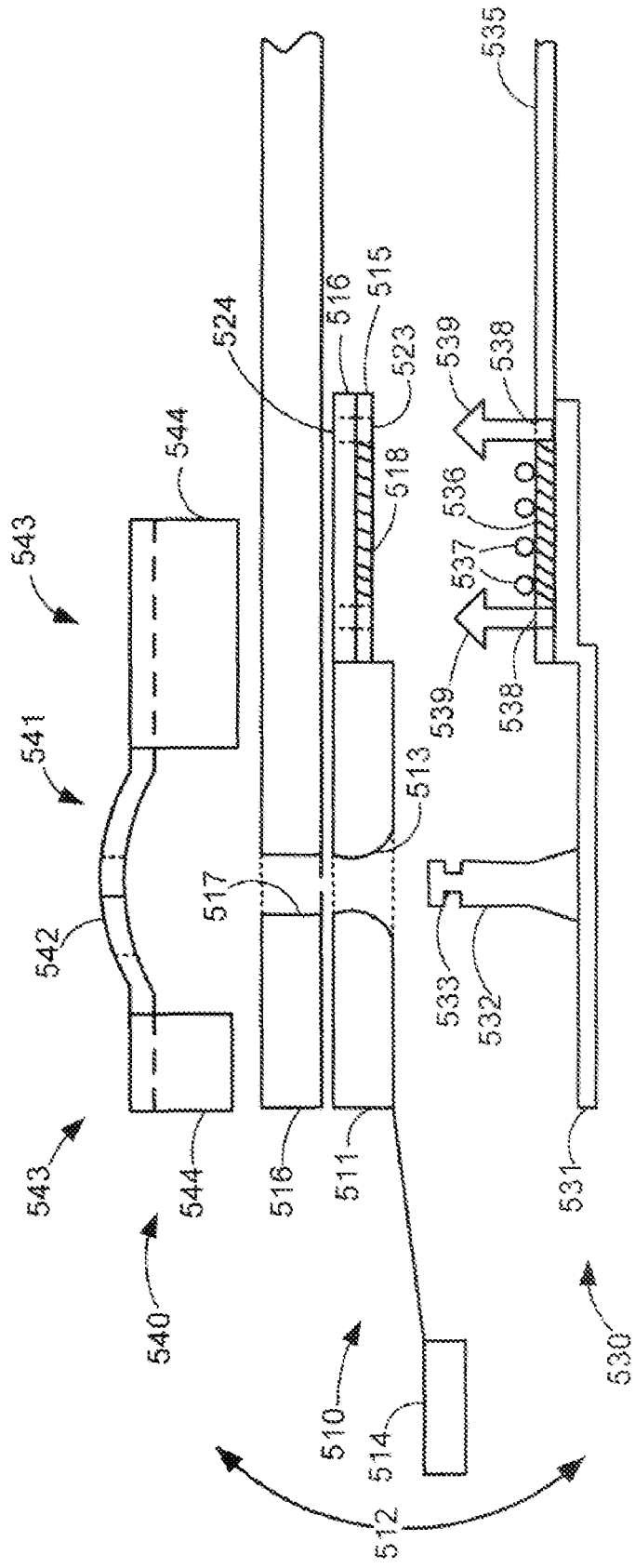
FIG. 6 is a simplified cross-section diagram (exploded view) of the HGA 510, connector 512 and actuator arm 516 shown in FIG. 5.

FIG. 6 is a cross-section diagram of the HGA 510, the connector 512 and the actuator arm 516. The HGA 510 includes a swage plate 511 having a flange 513. If used in a disk drive, the HGA 510 would be attached to the actuator arm 516 typically by swaging the flange 513 to a swaging hole 517 in the actuator arm.

The HGA 510 also includes a flex interconnect 515 fastened to the swage plate 511. The HGA flex interconnect 515 carries electrical signals to and from a read/write head 514. The HGA flex interconnect 515 includes a contact region 518 used to establish an external electrical connection. A backing plate 516 is attached to the HGA flex interconnect 515. The HGA flex interconnect 515 and the backing plate 516 include respective multiple alignment holes 523 and 524.

The connector 512 includes a bottom piece 530 and a top piece 540. The bottom piece 530 includes a base plate 531 preferably made of a resilient, high tensile strength material such as spring steel. The base plate 531 is shaped such that when the bottom piece 530 is placed in position, it applies an upward force on the contact region 518 of the flex interconnect 515 to ensure a firm electrical connection with a preamp flex interconnect (described below).

The connector 512 also includes a swage pin 532 mounted on the base plate 531. The swage pin 532 includes a notch 533 that engages with the top piece 540, as explained further below. When the bottom piece 530 is placed in position, the swage pin 532 projects through the flange 513 on the HGA 510 and the swaging hole 517 in the actuator arm 516.

In addition, the connector 512 includes a preamp flex interconnect 535 fastened to the base plate 531. The preamp flex interconnect 535 carries electrical signals to and from a preamplifier (not shown) mounted on the actuator arm 516. The preamp flex interconnect 535 includes a contact region 536 used to establish electrical contact with the corresponding contact region 518 of the HGA flex interconnect 515. Multiple gold bumps 537 are placed on the contact region 536 to enhance the electrical connection between the two flex interconnects. The preamp flex interconnect 535 also includes multiple alignment holes 538 for alignment with the respective alignment holes 523 and 524 in the HGA flex interconnect 515 and the backing plate 516.

The connector 512 further includes multiple alignment pins 539 mounted on the base plate 531. When the bottom piece 530 is placed in position, the alignment pins 539 project through the respective alignment holes 523, 524 and 538 of the HGA flex interconnect 515, the backing plate 516 and the preamp flex interconnect 535.

The top piece 540 of the connector 512 is also preferably made of a resilient, high tensile strength material such as spring steel. The top piece 540 includes a curved portion 541 having a keyhole slot 542. The keyhole slot 542 engages with the notch 533 in the swage pin 532 when the bottom piece 530 and the top piece 540 are placed in position with the top piece then slid forward. The curved portion 541 is shaped such that it applies an upward force on the swage pin 532 when engaged. This draws the bottom piece 530 and the top piece 540 together, thereby establishing a firm connection between the HGA 510 and the actuator arm 516.

The top piece 540 also includes a flat portion 543 having multiple tabs 544. The tabs 544 are used to maintain the alignment of the HGA 510 and the actuator arm 516.

Figure 7:
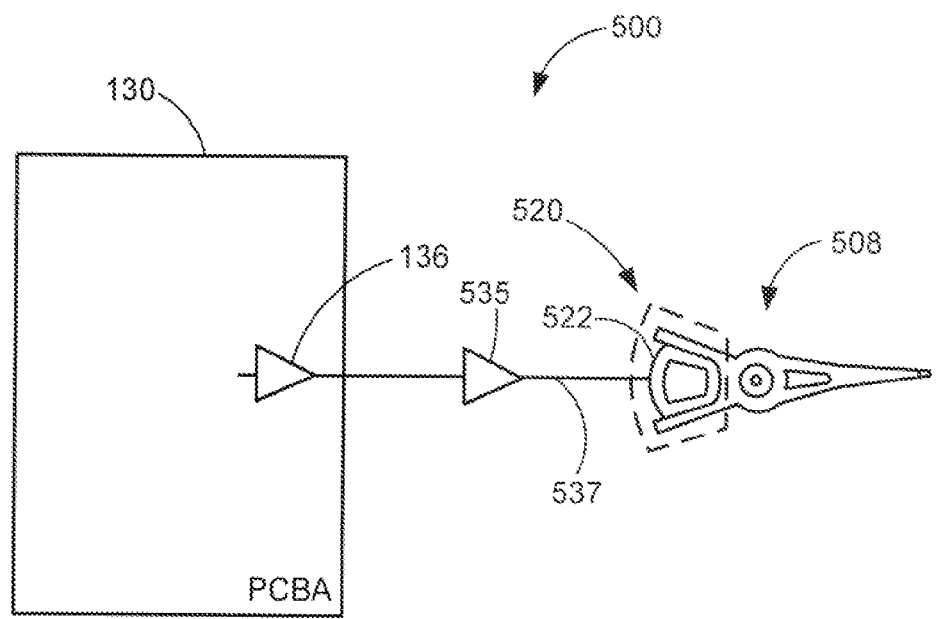
FIG. 7 is a simplified block diagram showing a servo system of the component tester 500 including a current amplifier 535.

FIG. 7 is a simplified block diagram illustrating a servo system of the tester 500. In this embodiment, a more powerful VCM 520 (including a voice coil 522) is used in place of the VCM 120 used in the tester 100. The VCM 520 can produce a higher torque and withstand much higher voltages and currents than the VCM 120. The more powerful VCM 520 is used to offset the increase in the moment of inertia of the actuator assembly 508 caused by the connector 512.

The tester 500 also includes a floating current amplifier 535 placed between the VCM driver 136 on the PCBA 130 (the same as on the tester 100) and the voice coil 522 of the VCM 520. The current gain of the current amplifier 535 is proportional to the ratio kT (VCM 520)/kT (VCM 120). The net effect of the current amplifier 535 is to proportionally increase the current through the VCM 520 to accommodate the increase in kT with the stronger VCM.

The back EMF of the voice coil 522 can be measured at the output of the VCM driver 136 using back EMF measurement techniques well-known in the art (e.g., current sense resistor). This allows the tester 500 to perform a load/unload of the HGA 510 using the same firmware and hardware as that used in the tester 100.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An apparatus for testing a component of a disk drive, comprising:
    a stationary platform configured to operably support one of either an actuator or a servo formatted storage disk, if the actuator then it is operably movable with respect to the stationary platform to supportingly position, in turn, the component;
    a movable platform configured to operably support the other of the actuator or the storage disk, if the actuator then it is operably movable with respect to the movable platform to supportingly position, in turn, the component, the movable platform selectively movable between a first position where the actuator and the storage disk are clearingly disposed away from each other so that the component can be attached to the actuator for testing, and a second position where the actuator and the storage disk are operably disposable to place the component in a data transfer relationship with the storage disk; and
    a control apparatus configured to selectively position the actuator via servo loop control while the component and the storage disk are in the data transfer relationship.

2. The apparatus of claim 1, wherein the servo formatted storage disk is characteristically the same as a disk used in the disk drive.

3. The apparatus of claim 1, wherein the servo formatted storage disk is characterized by a partially pre-written servo pattern, and wherein the control apparatus is further configured to write additional servo information while the component and the storage disk are in the data transfer relationship.

4. The apparatus of claim 1, wherein the storage disk is rotated by a motor that is characteristically the same as a motor in the disk drive.

5. The apparatus of claim 1, wherein the control apparatus includes a processing unit configured to be controlled by computer executable instructions stored in a memory.

6. The apparatus of claim 1, wherein the control apparatus includes a read channel that is characteristically the same as a read channel in the disk drive.

7. The apparatus of claim 1, wherein the control apparatus includes a base assembly control unit configured to execute computer instructions stored in memory to position the movable platform.

8. The apparatus of claim 1, wherein the movable platform is linearly positionable with respect to the stationary platform.

9. A method for testing a component of a disk drive, comprising the steps of:
    supporting one of either an actuator or a servo formatted storage disk on a stationary platform of a testing apparatus, if the actuator then it is operably movable with respect to the stationary platform and thereby supportingly positions, in turn, the component;
    supporting the other of the actuator or the storage disk on a movable platform of the testing apparatus, if the actuator then it is operably movable with respect to the movable platform to supportingly position, in turn, the component, the movable platform selectively movable between a first position where the actuator and the storage disk are clearingly disposed away from each other so that the component can be attached to the actuator for testing, and a second position where the actuator and the storage disk are operably disposable to place the component in a data transfer relationship with the storage disk; and
    operating a control apparatus of the testing apparatus that selectively positions the actuator via servo loop control while performing a test on the component.

10. The method of claim 9, wherein the supporting the storage disk step is characterized by a disk that is characteristically the same as a disk used in the disk drive.

11. The method of claim 9, wherein the supporting the storage disk step is characterized by partially pre-writing the disk with a servo pattern and writing additional servo information during the operating a control apparatus step.

12. The method of claim 9, wherein the supporting the storage disk step is characterized by rotating the storage disk with a motor that is characteristically the same as a motor in the disk drive.

13. The method of claim 9, wherein the operating a control apparatus is characterized by using a read channel that is characteristically the same as a read channel in the disk drive.

14. The method of claim 9, wherein the operating a control apparatus step further positions the movable platform.

15. The method of claim 14, wherein the operating a control apparatus step linearly positions the movable platform with respect to the stationary platform.

16. The apparatus of claim 1 wherein the component comprises a head gimbal assembly (HGA) that is removably connectable to an actuator arm that is, in turn, supported by one of the platforms.

17. The apparatus of claim 16 further comprising a voice coil motor operably positioning the actuator arm.

18. The apparatus of claim 17 further comprising a voice coil driver that compensates for characteristic differences between the actuator and removable HGA combination in the testing apparatus in comparison to an actuator and non-removable HGA combination used in the disk drive.

19. The apparatus of claim 9 wherein the supporting the component step is characterized by removably attaching a head gimbal assembly (HGA) to an arm of the actuator.

20. An apparatus for testing a component of a disk drive, comprising:
    a data storage disk and a read/write head; and
    means for operably positioning the read/write head with respect to the data storage disk during attachment of the component to the testing apparatus, during operable testing of the component while the data storage disk and the read/write head are in a data transfer relationship, and during detachment of the component from the testing apparatus.

21. An apparatus for testing a component of a disk drive, comprising:
- a stationary platform configured to operably support one of either the component or a storage disk, the storage disk having a partially complete servo pattern;
- a movable platform configured to operably support the other of the component or the storage disk, the movable platform selectively movable between a first position where the component and the storage disk are clearingly disposed away from each other so that the component can be attached for testing, and a second position where the component and the storage disk are operably disposable in a data transfer relationship; and
- a control apparatus configured to selectively position the component via servo loop control and configured to write additional servo information to the partially complete servo pattern while the component and the storage disk are in the data transfer relationship.

22. A method for testing a component of a disk drive, comprising the steps of:
- supporting one of either the component or a storage disk on a stationary platform of a testing apparatus, the storage disk having a partially complete servo pattern;
- supporting the other of the component or the storage disk on a movable platform of the testing apparatus that is selectively movable between a first position where the component and the storage disk are clearingly disposed away from each other so that the component can be attached for testing, and a second position where the component and the storage disk are operably disposable in a data transfer relationship; and
- operating a control apparatus of the testing apparatus to selectively position the component via servo loop control and to write additional servo information to the partially complete servo pattern while performing a test on the component.

* * * * *